Figure 1:
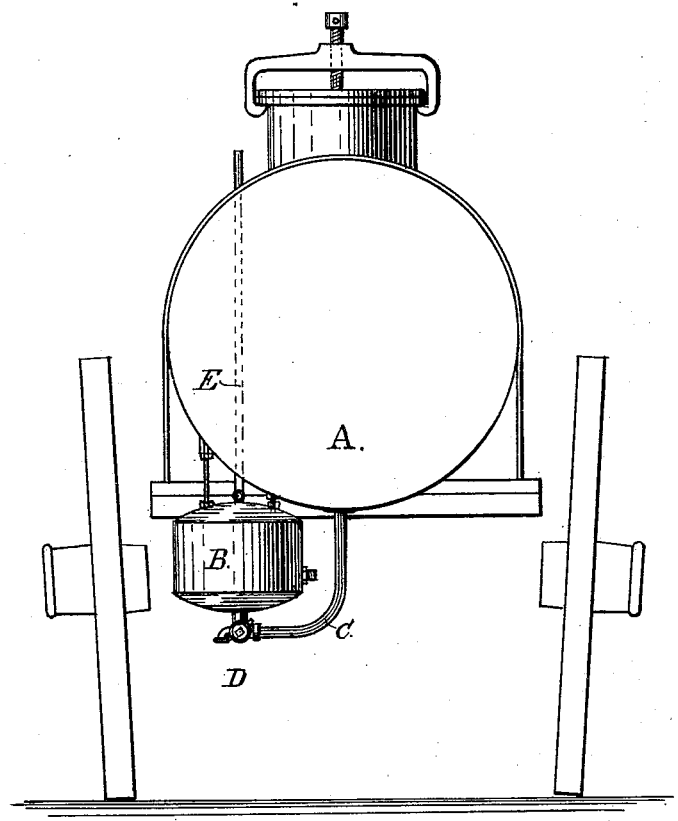

(No Model.)  2 Sheets—Sheet 1.

H. F. READ.
REGISTERING AND MEASURING FAUCET.

No. 479,721. Patented July 26, 1892.

WITNESSES:
F. C. Herring
H. L. King

Harry Felton Read, INVENTOR,
BY
F. A. Spencer, ATTORNEY.

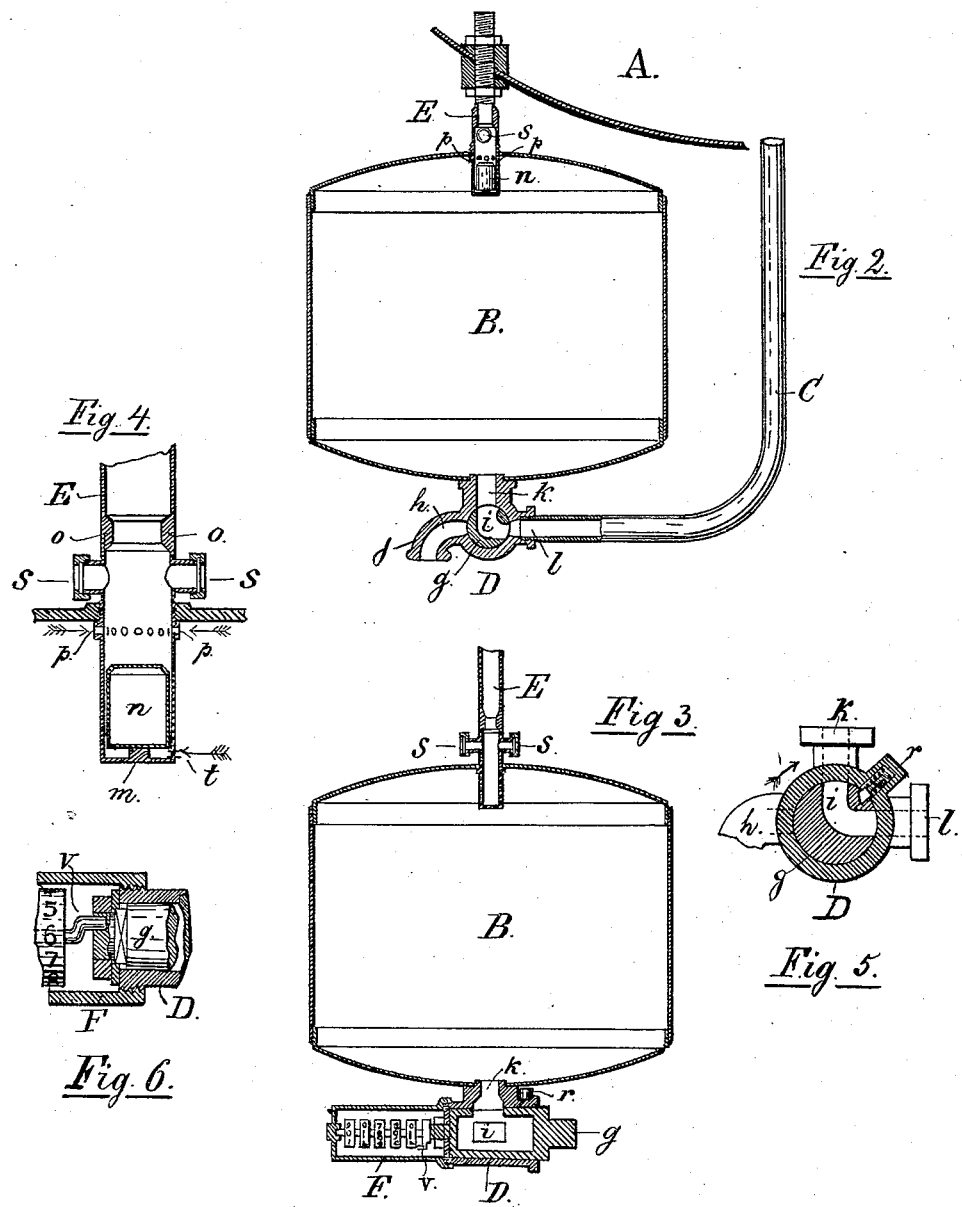

UNITED STATES PATENT OFFICE.

HARRY FULTON READ, OF BALTIMORE, MARYLAND, ASSIGNOR OF ONE-HALF TO LEVI A. DODD, OF SAME PLACE.

REGISTERING AND MEASURING FAUCET.

SPECIFICATION forming part of Letters Patent No. 479,721, dated July 26, 1892.

Application filed August 19, 1891. Serial No. 403,144. (No model.)

*To all whom it may concern:*

Be it known that I, HARRY FULTON READ, a citizen of the United States, residing at Baltimore, in the State of Maryland, have invented certain new and useful Improvements in Apparatus for Delivering and Registering Oil, &c.; and I do declare the following to be a full, clear, and exact description of the invention, such as will enable others skilled in the art to which it appertains to make and use the same, reference being had to the accompanying drawings, and to the letters of reference marked thereon, which form a part of this specification.

My improvement consists of a simple but effective apparatus to be applied to tanks, vats, barrels, or other receptacles for oils, liquors, or other commodities in the sale or delivery of which it is desired to keep a tally or register of its contents withdrawn from the tank or other containing-vessel, and relates especially to an improved form of combined vent-pipe and stop-valve for securing exactness in measurement and preventing waste. Such devices are often necessary for various purposes, but especially as a check upon salesmen or delivering-agents to prevent dishonesty or the temptation thereto by providing a delivering apparatus including a recording mechanism acting automatically and beyond the control of the delivering agent.

The special application which I have made of my improvement, as hereinafter set forth, is to wagon-tanks for the sale and delivery of burning-oils or other fluids. The tank, mounted upon wheels, is made of any desired capacity, usually of several hundred gallons, and delivery is made therefrom in some fixed unit of measure, ordinarily five gallons; but such unit of measure may be varied to suit circumstances, the nature of the business, &c.

The various features of my invention are illustrated in the accompanying drawings, in which—

Figure 1 is an elevation of my device applied to a wagon oil-tank A, showing the general arrangement of the parts. Fig. 2 is a transverse sectional view, on a larger scale, through the center of the delivery-tank B, the supply-pipe C, the cock D, and the vent-pipe E. Fig. 3 is a sectional view in a plane at a right angle to that of Fig. 2 through the center of the delivery-tank B, the cock D, the register F, and the vent-pipe E. Fig. 4 is a central section of the lower portion of the vent-pipe E in the same plane as that of Fig. 3. Fig. 5 is a section of the cock D in the same plane as Fig. 2, showing the ratchet $r$; and Fig. 6 is an enlarged section in the same plane as Fig. 3, showing the connections of the cock D and register F.

In Fig. 1 the rear end of the main tank A is seen mounted upon the truck or wagon. Below it and properly supported, preferably by bolts secured in the body of the main tank A, is the delivery-tank B, connected with the interior of tank A by the supply-pipe C.

In the pipe C, immediately below the bottom of tank B, is placed the three-way cock D, having the ports $h\ k\ l$ for the admission and discharge of oil and the plug or valve $g$ containing the valve-port $i$. When the valve $g$ is in the position shown in Figs. 2 and 5, the oil flows from the main tank A through the pipe C and valve-port $i$ into the delivery-tank, filling the latter. The vent-pipe E, hereinafter more fully described, furnishes a vent for the air in tank B. It is obvious that if the valve $g$, as shown in Figs. 2 and 5, be rotated one-quarter of a turn to the left or three-quarters of a turn to the right, the valve-port $i$ will connect the ports $h$ and $k$, and the oil in tank B will be discharged through the spout $j$. I arrange the valve $g$ to rotate in one direction only, preferably from left to right, as shown by the arrow in Fig. 5. Its rotation in the opposite direction is prevented by the spring-ratchet $r$, Figs. 5 and 6, firmly secured in the casing of the cock D.

On the exterior hub of the cock D at its end opposite the stem of the valve and inclosed in a metal case is firmly secured a register F of the usual construction for registering rotary motion by indicating in figures successive revolutions around an axis. I employ a register arranged to count in intervals of five, as "5," "10," "15," "20," &c., up to "100,000." A crank $v$, inclosed within the case of the register, connects the axis of the register with the valve $g$, so that at each complete revolution of the valve the register is actuated and the number shown at the sight-opening in the case (not shown in the drawings) is increased by five. The crank $v$ is so adjusted in connection with the valve $g$ that the register will be actuated and a record made at the moment when by the rotation of the valve communication is opened between the delivery-tank and the discharge-spout through the ports $k$ and $h$ and the valve-port $i$. It is evident that the valve cannot be opened to run any oil whatever out of tank B without the register indicating the delivery of five gallons, for which amount the salesman will be chargeable in settlement, and he is not likely to sell or otherwise dispose of any less quantity.

The delivery-tank B is cylindrical in form and made of wrought-iron with a convex top and bottom of sheet-steel, securing strength and lightness. From the highest point of the top of the tank the vent-pipe E rises to a point somewhat higher than the top of the main tank A, preferably passing through the latter. It is evident that there can be no overflow of oil through the vent-pipe, and that when the delivery-tank is filled the oil would naturally rise in the vent-pipe to a level with the oil in the main tank.

To secure exactness and prevent the flow of any excess over five gallons from the delivery-tank after each filling thereof, I employ the devices shown on an enlarged scale in Fig. 4, in which the lower end of the vent-pipe E appears secured in the top of tank B at its highest point.

The vent-pipe is made, preferably, of cast-brass and closed at its lower end. It has within it at the bottom a small elevation or lug $m$, and above exterior to the tank a narrowed portion or neck $o$, formed by an annular projection from the inner wall of the tube, said projection having its lower edge beveled to form a seat for the float-valve $n$. Said float-valve $n$ is a hollow closed cylinder of thin sheet-brass fitting accurately within the pipe E and having its upper corner beveled to fit the valve-seat $o$. When no oil is in the vent-pipe, the float $n$ rests upon the lug $m$. When oil from tank A is first admitted to tank B after the latter has been emptied, the air in tank B rushes out through the vents $p$ $p$ in the pipe E just within tank B and above the float. When the oil rising in tank B reaches the level of the pipe E, it enters the pipe at the oil-inlet $t$ below the float. The float is then lifted by the rising oil (the small portion of air remaining in tank B passing out around the sides of the float) until tank B is filled, when the float is forced up the pipe by the pressure of the oil against the beveled neck or valve-seat $o$ and firmly held there, thus cutting off any further flow of oil as soon as tank B is full. The presence of the float at this point is made visible to the operator by the two sight-openings $s$ $s$, which are closed with glass, thus showing that the delivery-tank is full. The valve $g$ may then be rotated and the tank emptied.

It results from the construction and operation of the apparatus described that no more than five gallons can pass from the main tank into the delivery-tank at any one setting of the valve $g$; also, that the register will count five for each filling or partial filling of the tank B—that is, for each five gallons or fractional part thereof disposed of; also, that there can be no waste of oil from the vent-pipe. This system does not provide for selling any quantity of its contents less than the full capacity of the delivery-tank; but said tank may be as small as desired, or one main tank may be provided with several delivery-tanks with a register for each, said tanks having different capacities.

All the connections of my device are securely made and protected, so as not to be easily disarranged by accident or with fraudulent design.

I claim as my invention and desire to secure by Letters Patent—

1. In an apparatus for delivering and registering oil or other fluids, the combination, with the main tank, the delivery-tank, and the interposed three-way cock actuating a register, substantially as described, of a combined vent-pipe and stop-valve consisting of a tube E in the delivery-tank, containing a float-valve $n$, a valve-seat $o$, an oil-inlet $t$ in the tube below the float, and one or more air-vents $p$ $p$ in the tube above the float, substantially as described.

2. A vent-pipe for oil-tanks or other receptacles for fluids, consisting of a tube E, containing a float-valve $n$, a valve-seat $o$, an oil-inlet $t$ in the tube below the float-valve, and an air-vent $p$ $p$ in the tube above the float-valve, substantially as described.

3. A vent-pipe for oil-tanks or other receptacles for fluids, consisting of a tube E, containing a float-valve $n$, a valve-seat $o$, an oil-inlet $t$ in the tube below the float-valve, an air-vent $p$ $p$ in the tube above the float-valve, and one or more sight-openings $s$ $s$, substantially as described.

In testimony whereof I affix my signature in presence of two witnesses.

HARRY FULTON READ.

Witnesses:
 THOS. POULTNEY, Jr.
 ROBT. READ.